Dec. 8, 1970 W. O. PARK 3,546,638

COMPACT FILTER FOR BROADBAND ELECTROMAGNETIC INTERFERENCE SUPPRESSION

Filed Nov. 1, 1968

INVENTOR.
William O. Park

BY Barry L. Clark
Robert W. Beart
His Att'ys

United States Patent Office 3,546,638

Patented Dec. 8, 1970

3,546,638

COMPACT FILTER FOR BROADBAND ELECTROMAGNETIC INTERFERENCE SUPPRESSION

William O. Park, Cardiff-By-The-Sea, Calif., assignor to Illinois Tool Works Inc., Chicago, Ill., a corporation of Delaware

Filed Nov. 1, 1968, Ser. No. 772,607
Int. Cl. H01h *7/14*
U.S. Cl. 333—79 4 Claims

ABSTRACT OF THE DISCLOSURE

Broadband filter providing high insertion loss in very small package includes a thin multilayer, disc, ceramic feed-through capacitor in a shouldered enlarged diameter portion of the filter shell and an impedance member such as a ferrite core inside a reduced diameter threaded portion of the filter shell.

BACKGROUND OF THE INVENTION

Field of the invention

This invention relates to filters for suppression of electromagnetic interference having effective attenuation at frequencies in the range from twenty kilohertz through one thousand megahertz.

Description of the prior art

Presently available broadband filters for suppression of electromagnetic interference are necessarily quite large in that their effectiveness for low frequencies is determined mainly by the size of the capacitor used therein. It has been common to use ceramic capacitors in filters which have dielectric constants in excess of one thousand. However, such capacitors are generally of the tubular type and thus are limited in their capacitance for a given size due to the fact that they have to have a considerable wall thickness in order to be self-supporting when being handled and fired. For example, U.S. Pat. 3,289,118 shows a filter having one end which is threaded and a second end which has a shoulder extending radially outwardly from the threads so as to form a wall which will contact one side of a metal panel when the threaded end is inserted through an aperture in the panel and a nut screwed thereon to hold the filter in firm contact with the panel. The overall size of the prior art filter shown in the referenced patent is quite large compared to the size of the capacitor therein since both the capacitance and impedance portions of the filter are contained in a constant diameter bore which is necessarily limited by the wall thickness necessary to accommodate the threads.

SUMMARY

It is an object of this invention to provide a filter which provides a large amount of insertion loss over a broad frequency range in a very small package.

It is another object of this invention to provide a filter which is easy to assemble and extremely rugged and reliable in its performance.

A still further object of this invention is to provide a filter having an extremely low DC resistance.

These objects are obtained by the filter of the present invention wherein a hollow metal case or shell member is threaded at one end for receipt of a nut for holding the filter against a metal panel and has a shouldered portion at its opposite end which abuts against the panel due to the force applied by the nut. The shouldered portion of the filter case has a very thin wall and is of a length just sufficient to accept a multilayer ceramic feed-through capacitor and a thin layer of a sealing compound such as epoxy. Since capacitive reactance varies inversely with frequency while inductive reactance varies directly with frequency, it will be appreciated that if the filter is to be capable of attenuating noise caused by low frequency sources such as switching and chopping that it will be necessary for it to utilize fairly large values of capacitance. With the filter of the present invention, it has been found possible to achieve a 20 db insertion loss which is equal to a 10:1 noise reduction at 28,000 Hz. and a 100 db insertion loss or 100,000:1 reduction in noise at 100 mHz. with a filter case extending only .1 inch from the panel to which it is attached. This extremely short length which can accommodate a .375 in. diameter capacitor having a value of 1.4 $\mu$f., is less than 20% as long as certain other filters now available which offer less of an insertion loss. The short length also results in a DC resistance which is extremely low, being less than .01 ohm at 25° C.

One property of ceramic feed-through capacitors is that their filtering capability falls off substantially due to internal resonance in the frequency range of approximately 5–50 mHz. and thus causes a dip in the otherwise generally smooth, and increasing, curve of insertion loss when plotted against frequency. It has become common to overcome this dip or drop in the curve of insertion loss versus frequency by placing a series impedance member in the circuit. In the filter of the present invention, the impedance member is preferably a ferrite core or bead which acts as an RF resistor in the higher frequency ranges and corrects for the deficiencies of the feed-through capacitor in the 5–50 mHz. range to permit the insertion loss versus frequency curve to remain fairly uniform. Since the ferrite core or bead may be quite small in size and still perform its function, it may readily be placed inside the filter at the small threaded end thereof.

The foregoing and other objects, features and advantages will be apparent from the following more particular description of a preferred embodiment hereof, as illustrated in the accompanying drawings.

DESCRIPTION OF THE PREFERRED EMBODIMENT

Figures 1, 2:
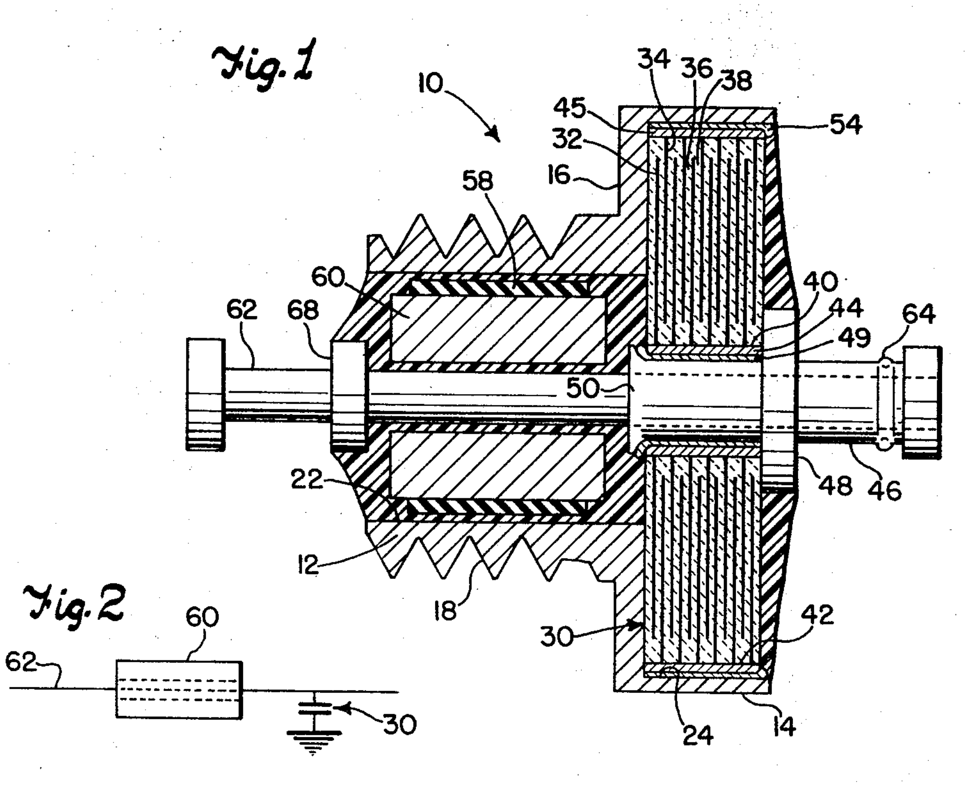
FIG. 1 is a longitudinal section of the filter.
FIG. 2 is a schematic circuit diagram for the filter.

In FIG. 1, a metal case or shell indicated generally at 10 has a threaded end portion 12 and an enlarged diameter portion 14 separated from the threaded portion 12 by a radially extending shoulder portion 16. The shoulder portion 16 is adapted to be held in engagement with a metal panel (not shown) to which the filter is mounted in use by means of a nut and lockwasher (not shown) which are adapted to be threadably engaged with threads 18 on thread end portion 12. The threaded end portion 12 has internal walls which define a first hollow end portion 22 of the metal shell 10. The enlarged end portion 14 of the shell 10 includes inner wall surfaces which define a second hollow portion 24 which is of considerably larger dimension than either the hollow portion 22 or the external diameter of the threads 18. Mounted within the enlarged second hollow portion 24 is a multilayer, monolithic, feed-through capacitor indicated generally at 30. The capacitor 30 has electrode surfaces 32, 34 formed on its alternate layers of dielectric ceramic 36, 38, respectively. The electrodes are offset so that the inner facing electrodes 32 lie on the surface of a hole 40 through the capacitor while the outer electrodes 34 lie on the outer peripheral surface 42 of the capacitor. Since the capacitor layers are stocked to as many as forty or more layers when fired, they may be quite thin, in the range of .001 inch, yet be sufficiently strong to be handled.

Prior to insertion of the capacitor 30 in the shell 10, a coating of silver paint is applied to the exposed portions of the inner and outer electrodes and then fired to fuse the silver to the electrodes so as to form inner and outer terminations 44, 45. The capacitor is then mounted on a sleeve member 46 with its outer end surface in engagement with shoulder 48 thereon while the inner end portion 50 is swaged over the inner face of the capacitor to mechanically hold the capacitor to the sleeve 46. An annular solder preform 49 is preferably placed around the inner end of sleeve 46 prior to the swaging over of portion 50. The application of heat to portion 50 of sleeve 46 will then cause the solder 49 to flow and bond the sleeve 46 to the silver terminal 44 on the capacitor. The capacitor 30 and attached sleeve member 46 may then be placed in the hollow portion 24 of shell 10 and an annular solder preform 54 placed near the periphery thereof. Application of heat to the shell 10 will melt solder 54 and bond the outer silver terminal 45 of the capacitor to the inner wall of the shell. After the capacitor is thus assembled to the shell 10, an insulating and spacing sleeve 58 is placed in the hollow portion 22 at the threaded end 12 of the shell. A ferrite core 60, which is preferably sealed against moisture penetration by a coating of epoxy, is then placed inside the insulating and spacing sleeve 58. A conductor pin member 62 is then placed through the core 60 and brought into telescoping relation with conductor sleeve member 46. In order to electrically bond conductor pin 62 to sleeve 46, the end of pin 62 may be coated with silver bearing epoxy. To enhance the bond, the sleeve 46 and pin 62 may be crimped together at 64. The filter is hermetically sealed at each end by means of a potting compound such as epoxy which is applied between the walls of the shell and the shoulder portions 48, 68 on the sleeve and pin members respectively.

FIG. 2 shows a schematic electrical diagram of the filter of the preesnt invention which is of the type referred to as an "L-section." As can be seen, the conductor pin 62 passes through the impedance element or ferrite core 60 and is connected to ground through the capacitor 30.

Figure 3:
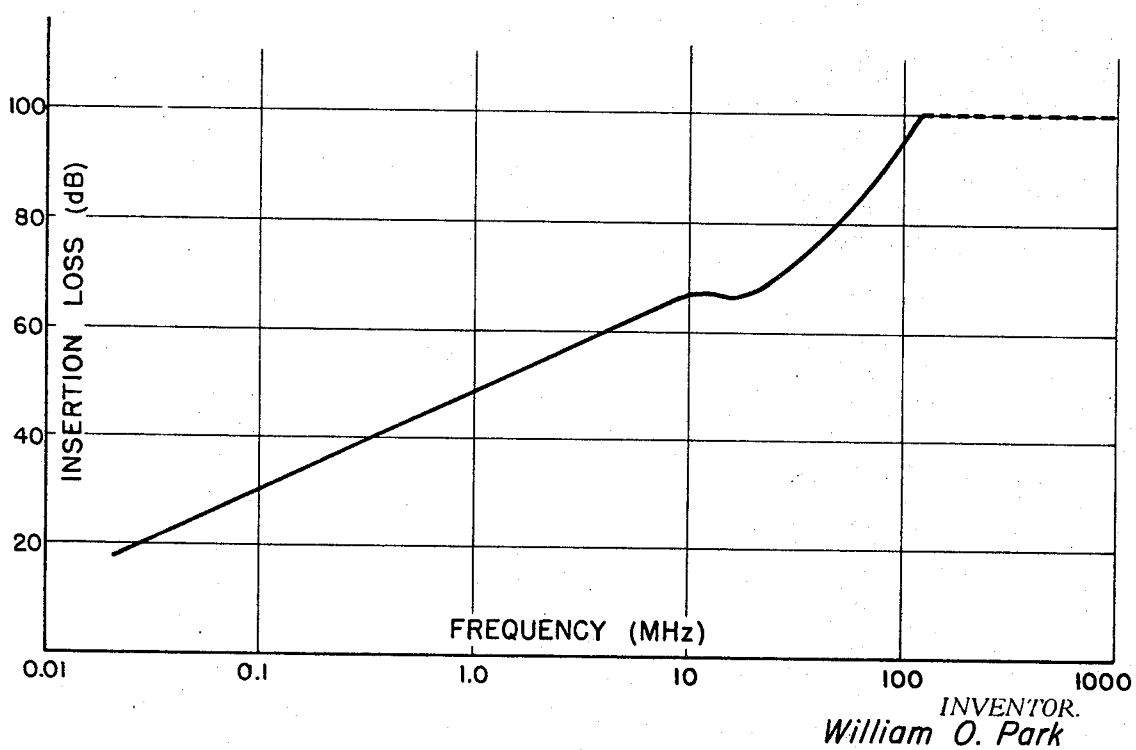
FIG. 3 is a graph showing Insertion Loss versus Frequency.

FIG. 3 shows the performance of a filter made in accordance with the present invention and illustrates the relatively high insertion loss characteristic of the filter over a very broad frequency range and especially in the low frequency range below .1 mHz. The physical dimensions of the filter for which this curve is typical comprise a maximum diameter of .400 inch, a length of the extended diameter section 14 containing the capacitor of only .100 inch, a thread diameter of .250 inch, and a thread length of .175 inch. The extremely compact design of the filter not only makes it particularly useful for those applications where space is at a premium but also permits the conductor pin 62 to be very short such that its DC resistance is less than .01 ohm at 25° C.

What is claimed is:

1. A broadband filter comprising a metallic shell, a first hollow portion in one end of said shell having external threads theeron, said threads being adapted to receive a threaded nut member for holding an increased dimension shoulder portion of said shell against an apertured metal panel, a second hollow portion in said shoulder portion at the other end of said shell positioned adjacent said first hollow portion, said second hollow portion having internal dimensions greater than the external diameter of said threaded first portion, a conductor pin means extending axially through said hollow portions and having first and second terminal portions extending beyond the ends of said first and second hollow portions, respectively, a multilayer, disc-like monolithic ceramic feed-through capacitor having external dimensions greater than the external diameter of said threaded first portion and mounted in said second hollow portion, said capacitor including a first set of electrodes surrounding an axial hole in said capacitor and electrically connected to said conductor pin means, said capacitor including a second set of electrodes extending to its outer periphery and electrically connected to said metallic shell, an impedance member mounted in said first hollow portion in surrounding inductive relation to said conductor pin means, said conductor pin means comprising a conductor pin surrounded by and in electrical contact with, at its second terminal portion, a hollow sleeve member, said sleeve member having an external flange positioned intermediate its inner end and said second terminal portion and in engagement with the outer face of said capacitor, the inner end of said sleeve member being positioned in overlying engagement with a portion of the inner face of said capacitor.

2. A filter in accordance with claim 1 wherein said impedance member comprises a ferrite core.

3. A filter in accordance with claim 1 wherein said capacitor has its first set of electrodes electrically connected to each other and to said conductor pin means by fused metal, the second set of electrodes also being connected to each other and to the metallic shell by fused metal.

4. A filter in accordance with claim 3 wherein each of said hollow portions are hermetically sealed at their outer ends by a sealing compound positioned between the inner walls of the shell and said conductor pin means.

References Cited

UNITED STATES PATENTS 2,756,375 7/1956 Peck ---------------- 333—79

FOREIGN PATENTS 227,714 7/1941 Germany ------------ 333—79

ELI LIEBERMAN, Primary Examiner

S. CHATMON, Jr., Assistant Examiner

U.S. Cl. X.R.

333—76